(12) United States Patent
Borsoi (10) Patent No.: US 7,231,699 B2
(45) Date of Patent: Jun. 19, 2007

(54) LACE BLOCKING DEVICE

(75) Inventor: Bruno Borsoi, Vittorio Veneto (IT)

(73) Assignee: Salomon S.A., Metz-Tessy (FR)

( * ) Notice: Subject to any disclaimer, the term of this patent is extended or adjusted under 35 U.S.C. 154(b) by 0 days.

(21) Appl. No.: 10/886,607

(22) Filed: Jul. 9, 2004

(65) Prior Publication Data

US 2005/0005477 A1    Jan. 13, 2005

(30) Foreign Application Priority Data

Jul. 10, 2003    (FR) ................... 03 08445

(51) Int. Cl.
*A43C 7/00* (2006.01)
(52) U.S. Cl. ................... 24/712.5; 24/712.6; 24/136 A
(58) Field of Classification Search ............. 24/136 R, 24/136 A, 115 L, 115 M, 712.5, 712.6, 712.1; 36/50.1
See application file for complete search history.

(56) References Cited

U.S. PATENT DOCUMENTS

| | | | | |
|---|---|---|---|---|
| 23,894 A | * | 5/1859 | Bentley et al. | ............. 114/199 |
| 1,139,595 A | * | 5/1915 | Starr | ......................... 24/136 A |
| 1,333,375 A | * | 3/1920 | Bauer et al. | .............. 24/136 A |
| 2,200,895 A | | 5/1940 | Rio | |
| 3,845,575 A | * | 11/1974 | Boden | ........................ 36/50.1 |
| 5,435,044 A | * | 7/1995 | Ida | ............................ 24/136 R |
| 5,471,713 A | | 12/1995 | Alter et al. | |
| 5,477,593 A | * | 12/1995 | Leick | ........................ 24/712.5 |
| 5,894,639 A | * | 4/1999 | Boden et al. | ............. 24/115 G |
| 2003/0041475 A1 | * | 3/2003 | Liu | ............................ 36/50.1 |

FOREIGN PATENT DOCUMENTS

FR    2 706 743 A1    12/1994

* cited by examiner

*Primary Examiner*—James R. Brittain
(74) *Attorney, Agent, or Firm*—Greenblum & Bernstein, P.L.C.

(57) ABSTRACT

A device for blocking at least one strand of a lace or other filiform element, the device including a rotatable blocking member and a hollow body, the hollow body having a cavity for housing the blocking member. The blocking member is circular, freely rotatable, and elastically biased in the direction of blocking the strand(s). The device further includes an unblocking member. The unblocking member has a gripping portion located at a distance from the hollow body.

24 Claims, 7 Drawing Sheets

LACE BLOCKING DEVICE

CROSS-REFERENCE TO RELATED APPLICATION

This application is based upon French Patent Application No. 03.08445, filed Jul. 10, 2003, the disclosure of which is hereby incorporated by reference thereto in its entirety and the priority of which is hereby claimed under 35 U.S.C. §119.

BACKGROUND OF THE INVENTION

1. Field of the Invention

The invention relates to a mechanical device for blocking flexible strands, such as cables, ropes, strings, laces, or any other such product.

The invention relates more particularly to the blocking of laces for shoes, boots, and other articles of footwear.

The invention further relates more particularly to the field of sports, specifically footwear for snowboarding, downhill skiing, cross-country skiing, bicycling, walking, hiking, and other activities.

2. Description of Background and Relevant Information

It is known to block flexible strands, particularly the laces of articles of footwear, by means of a blocking device.

For instance, French Patent Publication No. 2 706 743 and U.S. Pat. No. 5,477,593 disclose a blocking device that acts at least on one strand, such as at least one strand of a lace. According to these documents, the device has a pushing device that defines the rotational axis of a blocking member, as well as a hollow body, one cavity of which defines at least one path for the passage of each strand, on the one hand, and a housing for the blocking member, on the other hand. The latter has a circular form and is free in rotation about the axis that is itself movable in translation.

The device according to FR 2 706 743 and U.S. Pat. No. 5,477,593 functions by cooperation of the blocking member with each path for the blocking of each strand through a wedging effect. The blocking member is elastically biased in the direction for blocking the strand(s) by acting on its rotational axis.

In this manner, although it is elastically biased, the blocking member remains free in rotation and allows balancing the tensions on the two strands of the lace, even when there is a difference between the forces exerted on the strands. The blocking is therefore still achieved.

The reverse operation, that of unblocking, is obtained by manual action on the pushing device against the elastic bias.

It has been noted that the unblocking operation is not always easy.

Indeed, in order to make it more compact, the pushing member is pressed against the hollow body. This requires the user to hold the hollow body at the same time that the pushing member is displaced when it is desired to unblock the lace. The holding of the body in conjunction with the displacement of the pushing member can be a relatively difficult operation. It is even more difficult when the size of the device is made to be relatively small.

Additionally, the device is often housed in an area that is hard to reach and is cramped. This is the case, for example, for certain applications in the field of boots having flaps, the device being positioned in a space between flaps. Consequently, the accessibility to the device is reduced, which contributes to the difficulty in actuating the pushing member.

Finally, the unblocking is even more difficult when the user wears gloves, as the latter hinder the manipulation of the device.

Each of the aforementioned factors can contribute to hindering the unblocking operation.

SUMMARY OF THE INVENTION

An object of the invention is to facilitate the unblocking operation for a device provided with a circular blocking member that is elastically biased.

To this end, the invention is directed to a blocking device, acting at least on one strand, having a rotational axis for a blocking member, also having a hollow body, one cavity of which defines at least one path for the passage of each strand, on the one hand, and a housing for the blocking member, on the other hand, the blocking member having a circular form and being free in rotation about the axis that is itself movable in translation, the device functioning by cooperation of the blocking member with each path for the blocking of each strand through a wedging effect, the blocking member being elastically biased in the direction for blocking the strand(s) by action on its rotational axis, the device further having a member for unblocking the blocking member.

The unblocking member of the blocking device according to the invention has a gripping portion located at a distance from the hollow body.

The gripping portion constitutes an appendage that projects with respect to the hollow body. As a result, the gripping portion is easy to grasp and manipulate. Consequently, the unblocking force can be exerted without it being necessary to hold the hollow body. A resulting advantage is a greater facility for unblocking the device blocking member.

BRIEF DESCRIPTION OF DRAWINGS

Other characteristics and advantages of the invention will be better understood with reference to the following description, and with reference to the attached drawings showing, by non-limiting examples, how the invention can be embodied, and in which.

DETAILED DESCRIPTION OF THE INVENTION

Although the embodiments according to the invention described hereinafter relate more to the field of snowboarding, it is to be understood that they also apply to other fields, as mentioned above.

A first embodiment according to the invention will be described with reference to FIGS. 1–8.

Figure 1:
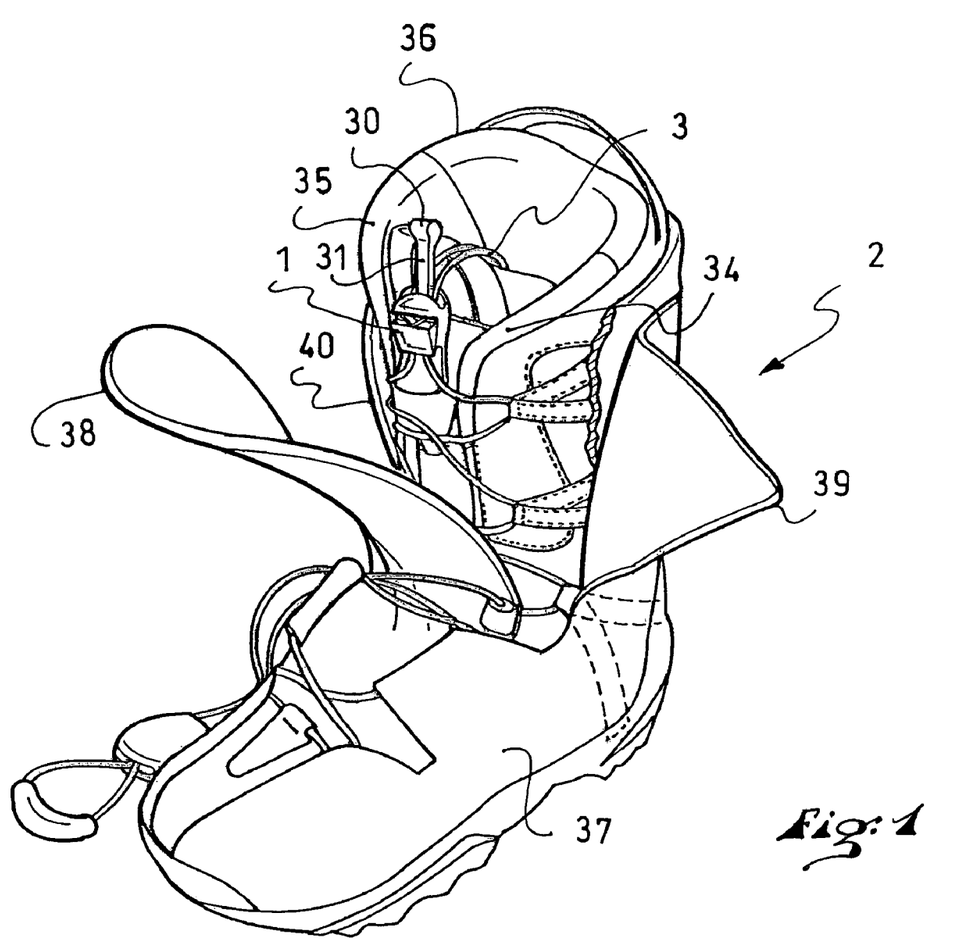
FIG. 1 is an overall view of a boot having in particular a lace and a blocker according to a first embodiment of the invention.

A lace blocker 1 is shown in FIG. 1 for blocking a lace 3 for an application to a snowboard boot 2.

Figure 2:
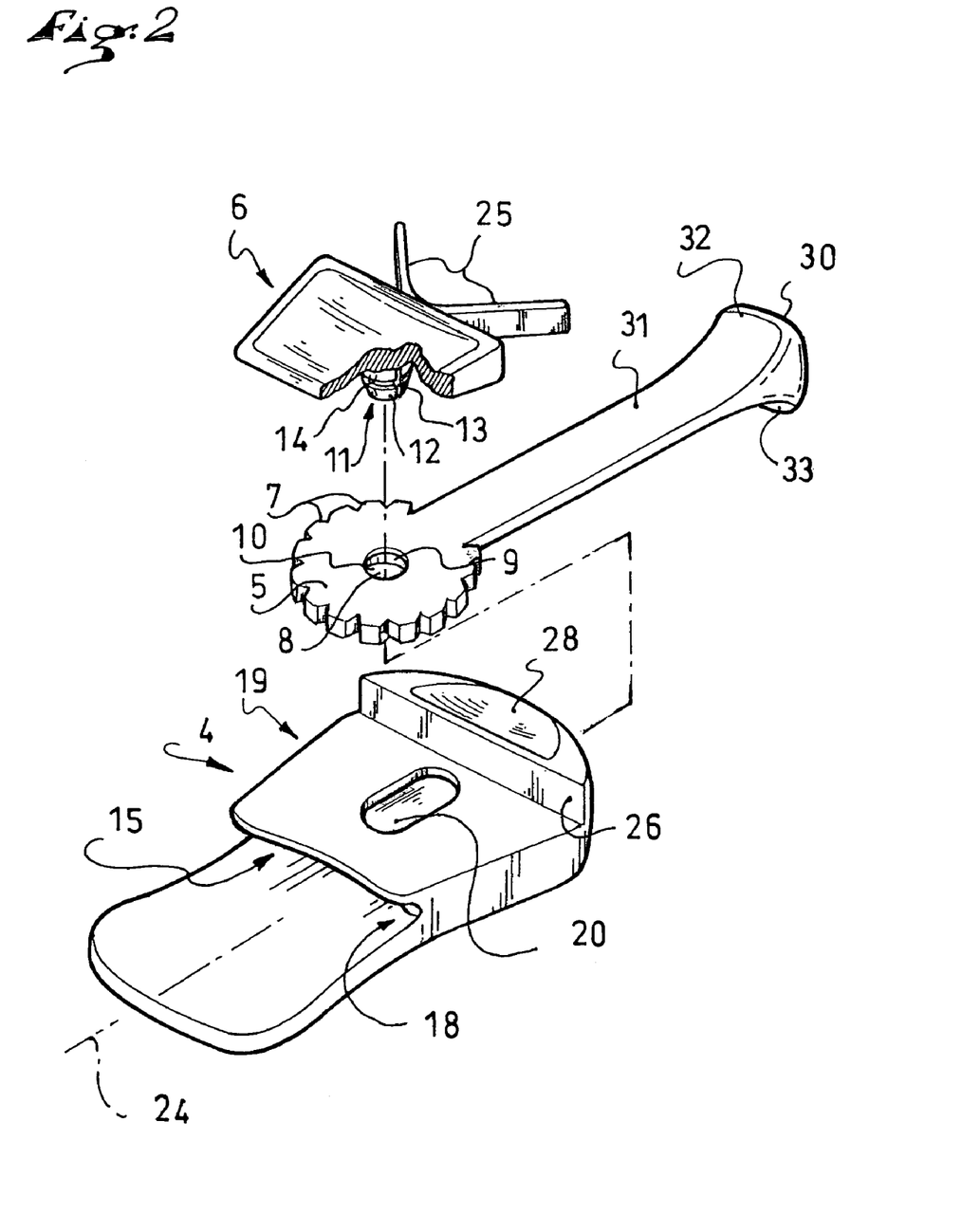
FIG. 2 is an exploded perspective view of the blocker of FIG. 1.

As shown more particularly in FIG. 2, the blocker 1, or blocking device, includes three elements, namely, a body 4, a blocking member 5 having a circular shape, and a cursor 6 located outside of the body 4 and connected to the blocking member 5 in order to manipulate it. The cursor can also be referred to as a slider or a pusher member.

As shown in FIG. 1, and with reference to other ones of the drawing figures, the body of the blocker is not directly affixed to the liner 36 or to the envelope 37 of the boot. Instead, the blocker 1 is connected to those parts of the boot only via the lace extending through the body 4 of the blocker and lace guides, whereby the blocker 1 can be displaced on the lace to a desired lace-blocking position.

In the detail shown in the drawings, the blocking member 5 can take the form of a wheel provided with teeth 7 on its periphery.

Through the center of the blocking member 5, or wheel, is a hole 8 which, in the illustrated example, is lined with a facing 9 to define an eyelet 10 for receiving an axle 11 of the cursor 6 in a force-fit, or snap fitting used in ratchets, which then provides the rotational axis of the wheel of the blocking member 5.

The axle 11, or member extending alona the axis of the hole 8, which is circular and projects directly from the cursor, has a projecting side 12 adapted for the connection to the wheel 5.

This side is provided with an axial slit 13 on a portion of its length and is hollowed out by a peripheral receiving groove 14 adapted for receiving the wheel 5.

The end of the projecting side has the shape of a truncated cone.

This structure allows the assembly of the wheel 5 to the axle 11 by means of a snap fitting, like that of a rachet.

Figures 5, 6:
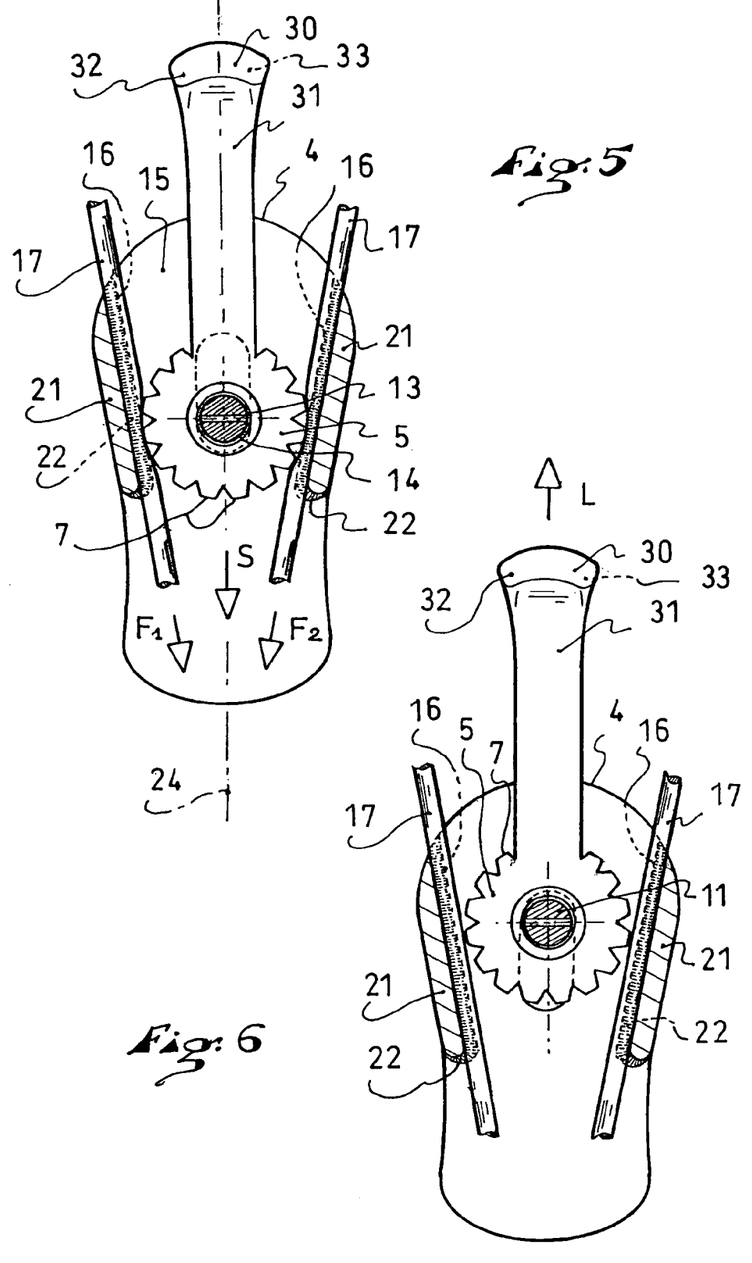
FIG. 5 is a cross-sectional view of the blocker, along the lines of contact of the strands and the paths, in the position for wedging the strands.
FIG. 6 is a view, similar to FIG. 5, of the blocker in the position for unblocking the strands.

As shown in FIG. 5, the body 4 has, on the inside, a cavity 15 adapted to house the toothed wheel 5 and defines, as is described below, two paths 16 for the passage and wedging of the strands 17 of the lace.

In order to mount the blocker 1 in the body 4, the wheel 5 is positioned inside the cavity 15 of the body 4 by passing through an opening 18 provided at an axial end of the body 4, and the cursor is ratcheted by its axle 11 in the eyelet 10 of the wheel 5 by traversing the wall of the upper surface 19 of the body 4 through a slit 20 provided in the upper surface 19 along a longitudinal axial direction of the body.

Figures 3, 4:
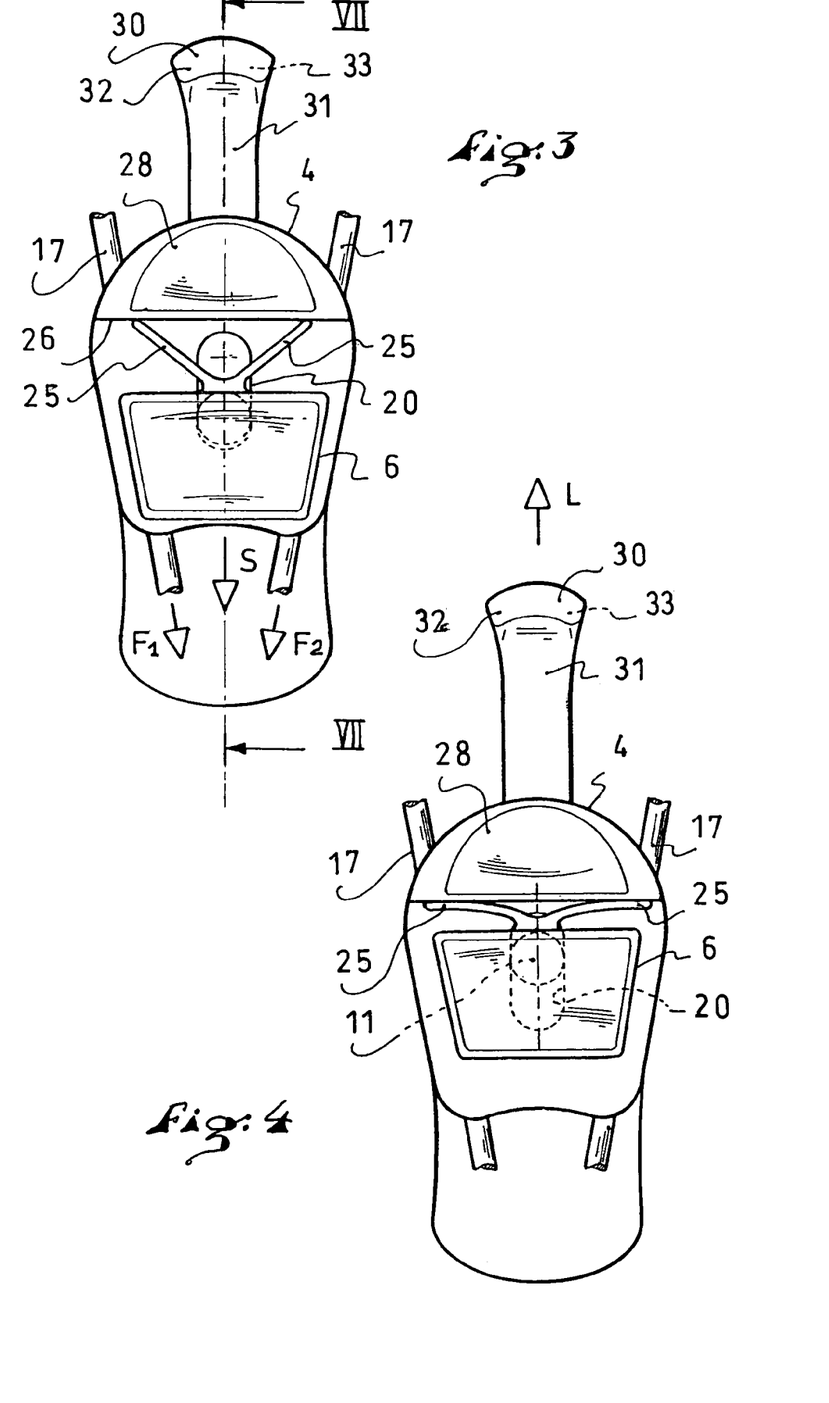
FIG. 3 is an external view of the top of the blocker in the position for wedging the strands.
FIG. 4 is an external view of the blocker, similar to FIG. 3, in the position for unblocking the strands.

The cursor 6 thus mounted is movable in translation with respect to the body 4, in the slit 20 and in the longitudinal direction of the body 4, along the directions of the arrows "L" or "S" shown, for instance, in FIGS. 3 and 4.

The dimensions of the groove 14 and of the hole 8 of the wheel 5 are provided such that the wheel 5 is freely mounted in rotation about the axle 11.

FIGS. 5, 6, 7, and 8 show more particularly the embodiment of the paths 16, and the cooperation of the blocking member or wheel 5 with the paths.

The paths 16 are located in the cavity 15, along each of the two lateral surfaces 21 of the body 4, and have serrations 22.

Figure 8:
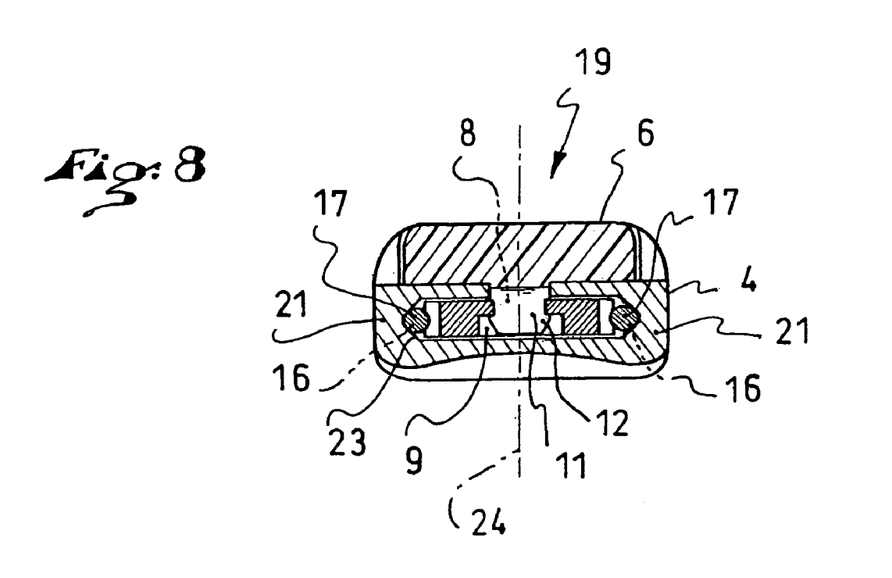
FIG. 8 is a cross-sectional view of the blocker taken along the line VIII—VIII of FIG. 7.

In order to receive the strands, the paths 16 have a cross-section in the form of a groove that can be rounded or formed of straight segments 23, as shown in FIG. 8.

As shown in FIGS. 5 and 6, the paths 16 are substantially rectilinear and their non-parallel directions converge so as to criss-cross on the symmetrical axis 24 of the blocker 1, in the "S" direction.

There are two extreme positions of the cursor 6, one corresponding to the blocking of the lace 3, and the other to the unblocking of the lace 3.

The blocking position is shown in particular in FIGS. 1, 3, 5, 7 and 8.

As shown in FIG. 5, in the blocking position, the wheel 5 that is constantly biased in the "S" direction tightens the strands 17 of the lace by pressing the strands against the bottom of the paths 16 of the body 4.

The blocking of the strands 17 is therefore achieved through a wedging effect due to the cooperation of the paths 16 and of the wheel 5.

The advantage offered by the blocking through the wedging effect is that the value for tightening the strands 17 by the wheel 5 is proportional to the forces of traction exerted on the strands and results solely from these forces.

Another advantage related to the fact that the wheel 5 is free in rotation about the axle 11 is that a difference in the forces of traction F1, F2 on the two strands 17 does not cause a wedging of the system or a relative sliding of one of the strands with respect to the blocking member 5.

An elastic mechanism, shown particularly in FIGS. 2, 3, 4 and 7, is also integrated into the blocker 1. This elastic mechanism can have various forms depending on the particular embodiment of the invention.

The elastic mechanism, as shown, includes two elastic tongues 25 that extend in a "V" from the center of the cursor 6. The free ends of the tongues 25 are provided so as to take support on a heel 26 formed by an edge of the body 4 so as to bias the cursor 6 in the blocking direction S shown in FIG. 3. The tongues 25 can also have a different form.

Consequently, the tongues 25 also bias the wheel 5, in this blocking direction "S," by means of its axle 11 that is affixed to the cursor 6.

Thus, the blocking member 5 is elastically biased in the direction for blocking the strands 17 by means of its rotational axle 11.

According to a particular form of the invention, the axle 11, the cursor 6 and the tongues 25 form a single element, that is, they are made in one piece.

The elements and the functioning described above offer the advantage of performing a precise and immediate blocking of the lace without it being necessary to act externally on the blocking member 5.

Figure 7:
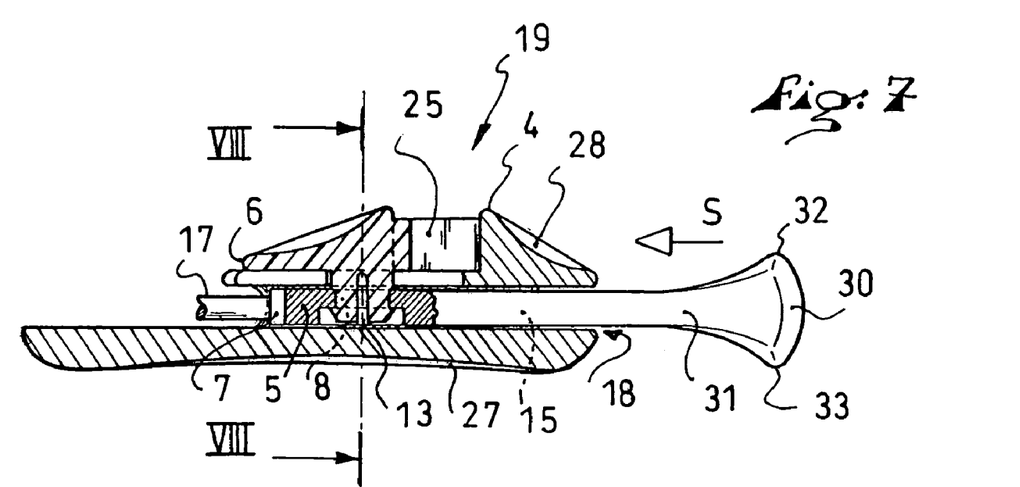
FIG. 7 is a cross-sectional view of the blocker taken along the line VII—VII of FIG. 3.

Additionally, as shown particularly in FIGS. 7 and 8, the body 4 has, on its upper and lower surfaces, cavities 27, 28, respectively, adapted to facilitate the ergonomic grip of the body 4 during the blocking.

The indentations of the cavities 27, 28 of the body 4 each correspond substantially to that of a finger oriented so as to exert a force in the direction "S."

Therefore, it is easier for the user to pull on the lace 3 with one hand and to press on the blocker 1 with the other hand in order to displace it on the lace to the desired blocking position.

Once this blocking position is reached, it suffices to release the blocker 1 without having to exert any other action on the cursor 6, in order to obtain the desired tightening, since the wheel 5 biased by the tongues 25 automatically exerts the desired wedging effect.

The advantage is that the blocking manipulation is all the more comfortable.

The invention has in particular the object of making the unblocking operation just as comfortable. To this end, according to the invention, the lace blocker 1 is provided with an unblocking member that has a gripping portion located at a distance from the hollow body 4. The gripping portion allows the unblocking member to be grasped without it being necessary to reach the body of the blocker.

According to the first embodiment of the invention, as seen in FIG. 2, the gripping portion is a grip 30. The grip 30 is connected to a handle 31, elongated along a vertical median plane of the boot, the handle being connected to the blocking member or wheel 5. The blocking member therefore has the grip 30 and the handle 31.

In a particular embodiment, the grip 30, the handle 31, and the wheel 5 form a unitary element, being made, for example, of a plastic material. The advantage of the unitary element is a simplification of the manufacture, as well as a reduction in production costs. However, it can be provided that a portion at least of these elements be produced separately, and then assembled. Other materials can also be provided for the manufacture.

According to the first embodiment of the invention, the wheel 5 and the handle 31 have substantially the same thickness, the wheel 5 and the handle 31 extending along the same plane. As seen in FIG. 7, this allows displacing the unitary element in the cavity 15 in the manner of a drawer. A subsequent advantage is a better quality in the guiding of the element.

As for the grip 30, it projects, for instance, with two opposing bosses 32, 33, on both sides of the handle 31. This allows for an easier grip. It is possible to manipulate it without force, particularly for pulling. Alternatively, the grip 30 could project on only one side of the handle, or even have substantially the same thickness.

The manipulation of the grip 30 is easier as the handle 31 keeps it at a distance from the hollow body 4. the grip 30 being spaced from the hollow body in the direction of the arrow L for unblocking the strands. Indeed, there is preferably a space that is sufficiently extended between the hollow body 4 and the grip so that gripping occurs by touching only the grip 30. Consequently, this means that it is not necessary to hold the hollow body 4 in order to manipulate the grip 30, even if it is possible to manipulate the grip by holding the hollow body.

An advantage that results from this construction is a better accessibility of the unblocking member, even if the blocker 1 is used on a boot. Indeed, as seen in FIG. 1, it is common for the blocker 1 to be inserted between the lateral 34 and medial 35 flaps of a liner 36. Since the latter is itself covered by an outer envelope 37, the blocker 1 is also covered by the tongue 38 and surrounded by the lateral 39 and medial 40 flaps of the envelope 37. As shown in FIG. 1, flaps 39, 40 of the envelope 37 extend around a lower leg area of the boot, whereas the lower portion of the envelope extends over an area of the foot of the wearer, with the lace 3 being guided by a plurality of lace guides. The emergence of the grip 30, or at least its better accessibility, allows for an easier pulling in order to unblock the wheel 5. Thus, the liner 36 can be easily loosened.

A traction on the grip 30 in the direction of the arrow L, i.e., in a direction for unblocking the strands, brings the wheel 5 to the position shown in FIGS. 4 and 6. The traction occurs against the action of the elastic mechanism that includes the tongues 25. When the force of traction or unblocking is sufficient, the wheel 5 is spaced from the paths 16 of the lace and from the strands 17 of the lace. The wheel 5 is spaced from the converging point of the directions of the paths 16. The wedging effect no longer occurs and the unblocking is achieved. Thus, the blocker 1 and the strands of string 17 can slide one with respect to the other. The sliding occurs simultaneously with the traction on the grip 30, since the wheel 5 is connected by the axle 11 to the hollow body 4. The structure of the blocker 1 therefore allows directly biasing the blocking member or wheel 5 in an unblocking direction. Given that the unblocking force is directly transmitted, the efficiency related to the unblocking is the best possible. A resulting advantage is that a low traction force is sufficient for the unblocking.

The traction force for unblocking the wheel 5 can be exerted along the symmetrical axis 24 of the blocker, or along an offset axis. Indeed, the handle 31 leaves the wheel 5 with a freedom that is limited but nonetheless sufficient for turning by taking support on the strands 17 upon blocking. This freedom of rotation of the wheel 5 is preserved despite the presence of the handle 31, since the distance between the handle and each lateral surface 21 is substantially greater than the thickness of a strand 17.

The other embodiment of the invention will be described hereinafter. As a convenience, only the significant differences with respect to the first embodiment will be shown.

Figure 9:
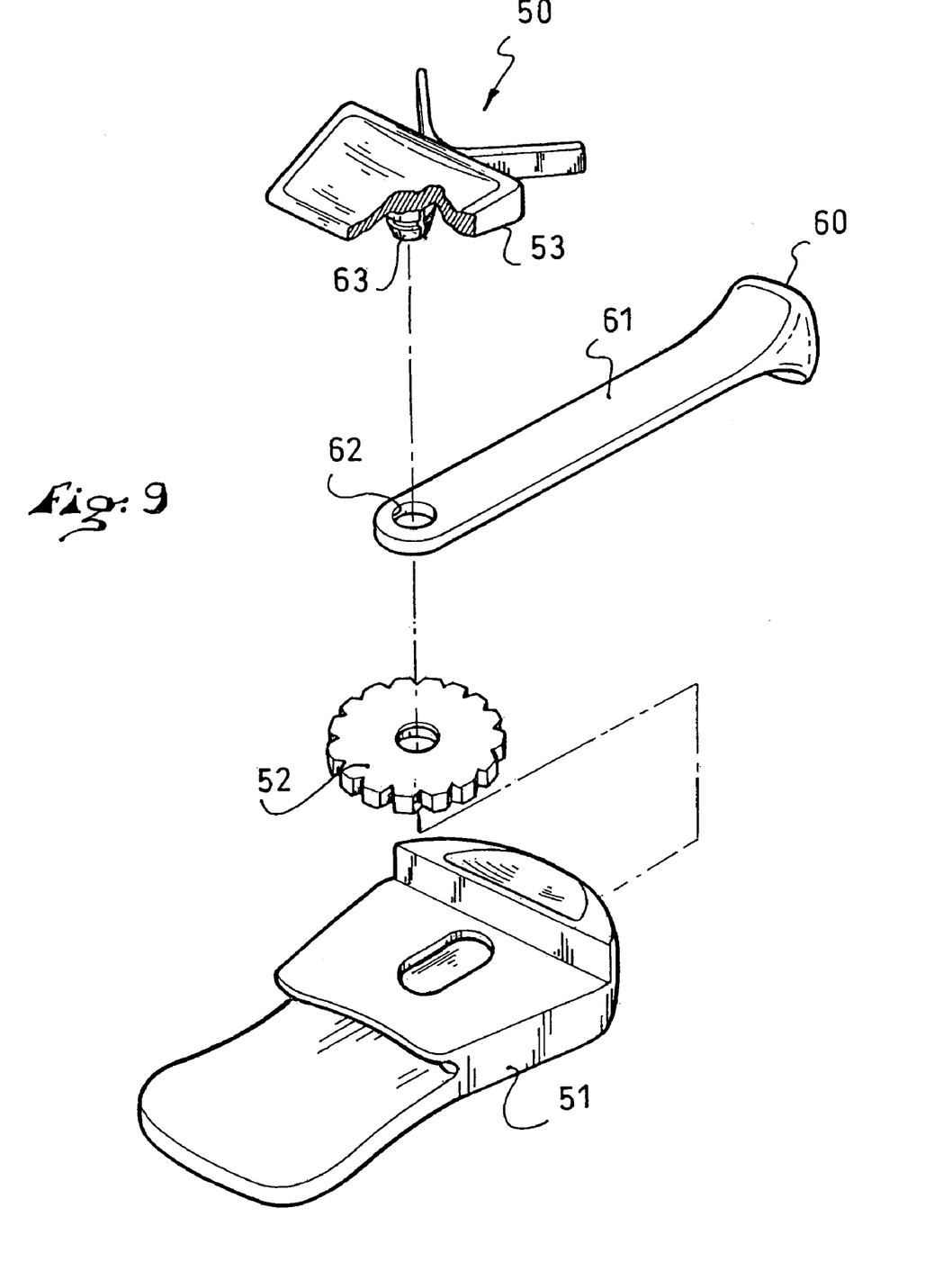
FIG. 9 is a view similar to FIG. 2, according to a second embodiment of the invention.

The second embodiment is shown in FIG. 9.

According to this embodiment, a blocker 50 has a hollow body 51, a blocking member shown in the form of a wheel 52, and a cursor 53. These elements are assembled to function in a manner similar to the blocker of the first embodiment.

According to the invention, an unblocking member has a gripping portion located at a distance from the hollow body 51.

The gripping portion is shown in the form of a grip 60 that is connected to a handle 61. In this manner, the unblocking member includes the grip 60 and the handle 61.

A connecting end of the handle 61, opposite the end receiving the grip, has a through hole 62. In this manner, the handle 61 and the wheel 52 are rotationally mounted on the same axle 63 originating from the cursor 53. Consequently, a traction on the grip 60 in a spacing direction with respect to the hollow body 51 biases the wheel 52 in an unblocking direction. Here again, the bias is direct, since the axle 63 is shared by the wheel 52 and the handle 61. The separation of the handle 61 from the wheel 52 gives complete freedom of rotation to the latter. A resulting advantage is that the wear of the teeth of the wheel 52 is distributed over its entire periphery.

Figure 10:
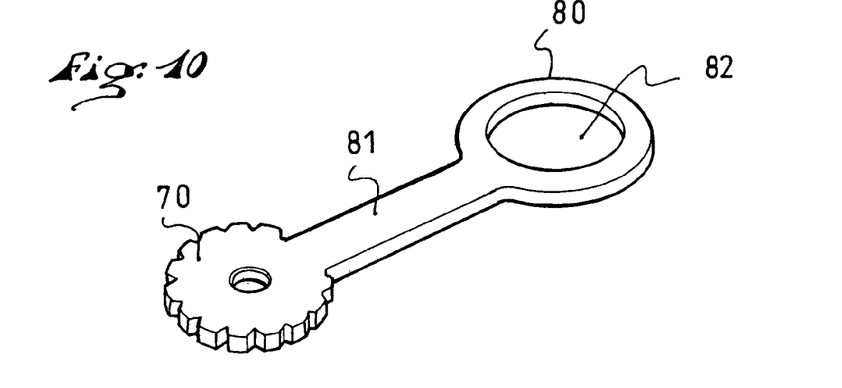
FIG. 10 is a perspective view of the inner elements of a blocker according to a third embodiment of the invention.

The third embodiment of the invention is shown in FIG. 10.

According to this example, a blocker has a wheel 70.

According to the invention, an unblocking member has a gripping portion located at a distance from the hollow body.

The gripping portion has a grip 80 that is connected to a handle 81. Here again, the unblocking member includes the grip 80 and the handle 81. The wheel 70, the grip 80 and the handle 81 form a unitary element.

In the third embodiment, the grip 80 includes an opening 82. This opening can be sufficiently large for the passage of a finger, allowing for a gripping with a bent finger.

Figure 11:
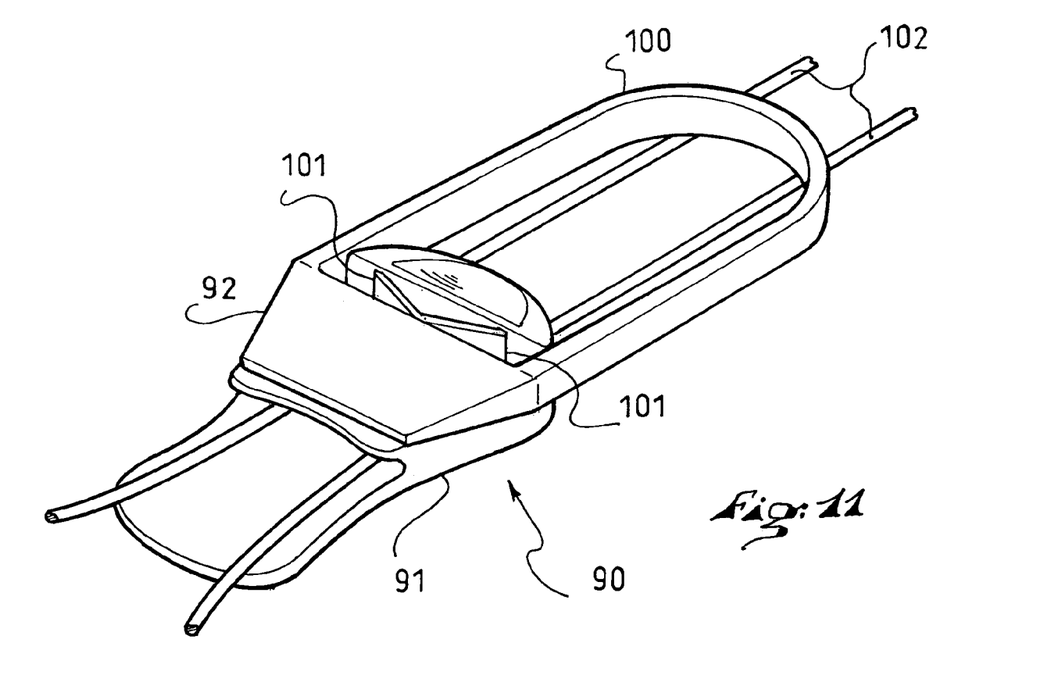
FIG. 11 is a perspective view of a blocker according to a fourth embodiment of the invention.

The fourth embodiment of embodiment of the invention is shown in FIG. 11.

According to this example, a blocker 90 has a hollow body 91 and a cursor 92.

According to the invention, an unblocking member has a gripping portion located at a distance from the hollow body.

The gripping portion has a grip 100 that is connected to the cursor 92. In this manner, the unblocking member now includes the grip 100 and the cursor 92. In a particular example, the grip 100, the cursor 92 and tongues 101 of an elastic member form a unitary element.

The grip 100 takes the form of a bow that projects with respect to the hollow body 91, in the direction of passage of the strands 102 of the lace. The grip/handle 100 is offset with respect to the plane for the passage of the strands.

Generally speaking, the invention can be made from materials and according to implementation techniques known to one skilled in the art.

In particular, each component can be made from a plastic material.

The invention is not limited to the particular details of the embodiments described hereinabove, and it includes all technical equivalents that can come into the scope of the following claims.

In particular, it can be provided that the gripping portion of an unblocking member be separated from the hollow body in a direction that is substantially perpendicular to the plane of passage of the strands of the lace. For instance, a handle and/or a grip can be subject to the cursor in order to project with respect to the latter.

What is claimed is:

1. A blocking device adapted to act on at least on one strand, said blocking device comprising:
a blocking member having a circular shape, freely rotatable about an axis, and movable in translation;
a hollow body comprising:
at least one cavity defining at least one path for passage of each of one or more strands;
a housing for the blocking member;
the device functioning by cooperation of the blocking member with each path of the at least one path for blocking of each strand through a wedging effect;
an elastic mechanism for elastically biasing the blocking member in a direction of blocking of said at least one strand by acting on a member extending along said rotational axis of the blocking member;
an unblocking member for releasing the blocking member, the unblocking member having a gripping portion spaced from the hollow body in a direction of unblocking of said at least one strand.

2. A blocking device according to claim 1, wherein:
each component of the device is made from a plastic material.

3. A blocking device according to claim 1, wherein:
the hollow body is freely displaceable relative to an article to which the blocking device is adapted to be affixed along the at least one strand to a blocking position on the strand.

4. A blocking device adapted to act on at least one strand, said blocking device comprising:
a blocking member having a circular shape, freely rotatable about an axis, and movable in translation;
a hollow body comprising:
at least one cavity defining at least one path for passage of each of one or more strands;
a housing for the blocking member;
the device functioning by cooperation of the blocking member with each path of the at least one path for blocking of each strand through a wedging effect;
an elastic mechanism for elastically biasing the blocking member in a direction of blocking of said at least one strand by acting on a member extending along said rotational axis of the blocking member;
an unblocking member for releasing the blocking member, the unblocking member having a gripping portion located at a distance from the hollow body;
the gripping portion comprising a grip, the unblocking member including the grip and a handle.

5. A blocking device according to claim 4, wherein:
the grip, the handle, and the circular blocking member form a unitary element.

6. A blocking device according to claim 4, wherein:
the circular blocking member and the handle extend along a single plane.

7. A blocking device according to claim 4, wherein:
the grip projects with respect to the handle.

8. A blocking device according to claim 4, wherein:
an opening extends through the grip.

9. A blocking device according to claim 4, wherein:
the handle is rotationally mounted on the rotational axis of the wheel.

10. A blocking device according to claim 4, wherein:
the distance between the handle and a lateral surface of the hollow body is substantially greater than the thickness of a strand.

11. A blocking device adapted to act on at least one strand, said blocking device comprising:
a blocking member having a circular shape, freely rotatable about an axis, and movable in translation;
a hollow body comprising:
at least one cavity defining at least one path for passage of each of one or more strands;
a housing for the blocking member;
the device functioning by cooperation of the blocking member with each path of the at least one path for blocking of each strand through a wedging effect;
an elastic mechanism for elastically biasing the blocking member in a direction of blocking of said at least one strand by acting on a member extending along said rotational axis of the blocking member;
an unblocking member for releasing the blocking member, the unblocking member having a gripping portion located at a distance from the hollow body;
the gripping portion being a grip, the unblocking member including the grip and a cursor, the grip being subject to the cursor.

12. An article of footwear comprising:
at least one lace having at least one strand;
a blocking device adapted to act on the at least on one strand, said blocking device comprising:
a blocking member having a circular shape, freely rotatable about an axis, and movable in translation;
a hollow body comprising:
at least one cavity defining at least one path for passage of each of one or more strands;
a housing for the blocking member;
the device functioning by cooperation of the blocking member with each path of the at least one path for blocking of each strand through a wedging effect;

an elastic mechanism for elastically biasing the blocking member in a direction of blocking of said at least one strand by acting on a member extending along said rotational axis of the blocking member;

an unbiocking member for releasing the blocking member, the unblocking member having a gripping portion spaced from the hollow body in a direction of unblocking of said at least one strand.

13. An article of footwear according to claim 12, further comprising:

an envelope adapted to receive at least a foot of a wearer;

said hollow body of said blocking device being freely displaceable along the at least one strand of the lace to a blocking position on the strand, the hollow body not being directly affixed to the envelope of the article of footwear.

14. An article of footwear according to claim 13, wherein:

said envelope comprises a lower leg area adapted to extend over a lower leg area of the article of footwear;

said at least one lace is located at least on said lower leg area of the envelope.

15. An article of footwear according to claim 12, further comprising:

an envelope adapted to receive at least a foot of a wearer;

a plurality of lace guides for guiding said lace on opposite sides of the envelope.

16. An article of footwear according to claim 12, further comprising:

an envelope adapted to receive at least a foot of a wearer;

the hollow body being freely displaceable relative to the envelope along said at least one strand of the lace.

17. A blocking device adapted to act on at least on one strand, said blocking device comprising:

a blocking member having a circular shaped portion, freely rotatable about an axis, and movable in translation;

a hollow body comprising:

a housing, said blocking member being mounted in said housing for rotation about an axis and for movement in translation;

at least one cavity defining at least one path for passage of each of one or more strands, each of said at least one path extending between said blocking member and a surface of said hollow body;

said blocking member movable in said housing between a blocking position, whereby said blocking member wedges at least one strand against a surface of said hollow body, and a non-blocking position, whereby said blocking member is moved away from said surface of said hollow body;

an elastic mechanism for elastically biasing the blocking member toward said blocking position;

an unblocking member made in one-piece with said blocking member for enabling release of the blocking member by application of a force opposing said elastic biasing of said elastic mechanism, said unblocking member including a handle and a gripping portion, said handle being connected to and extending along a single plane with said circular blocking member, said gripping portion being located at a distance from said hollow body in both said blocking and non-blocking positions.

18. An article of footwear comprising:

an upper for receiving the foot of a wearer;

at least one lace having at least one strand;

a blocking device adapted to act on said at least on one strand, said blocking device comprising:

a blocking member having a circular shaped portion, freely rotatable about an axis, and movable in translation;

a hollow body comprising:

a housing, said blocking member being mounted in said housing for rotation about an axis and for movement in translation;

at least one cavity defining at least one path for passage of each of one or more strands, each of said at least one path extending between said blocking member and a surface of said hollow body;

said blocking member movable in said housing between a blocking position, whereby said blocking member wedges at least one strand against a surface of said hollow body, and a non-blocking position, whereby said blocking member is moved away from said surface of said hollow body;

an elastic mechanism for elastically biasing the blocking member toward said blocking position;

an unblocking member for enabling release of said blocking member by application of a force opposing said elastic biasing of said elastic mechanism, said unblocking member including a handle and a gripping portion, said handle being connected to and extending along a single plane with said circular blocking member, said gripping portion being located at a distance from said hollow body in both said blocking and non-blocking positions.

19. An article of footwear according to claim 18, further comprising:

an envelope adapted to receive at least a foot of a wearer;

said hollow body of said blocking device being freely displaceable along the at least one strand of the lace to a blocking position on the strand, the hollow body not being directly affixed to the envelope of the article of footwear.

20. An article of footwear according to claim 19, wherein:

said envelope comprises a lower leg area adapted to extend over a lower leg area of the article of footwear;

said at least one lace is located at least on said lower leg area of the envelope.

21. An article of footwear according to claim 18, further comprising:

an envelope adapted to receive at least a foot of a wearer;

a plurality of lace guides for guiding said lace on opposite sides of the envelope.

22. An article of footwear according to claim 18, wherein:

the handle of the unb locking member is elongated along a vertical median plane of the article of footwear.

23. An article of footwear according to claim 18, further comprising:

an envelope adapted to receive at least a foot of a wearer;

the hollow body being freely displaceable relative to the envelope along said at least one strand of the lace.

24. An article of footwear comprising:

at least one lace having at least one strand;

a blocking device adapted to act on the at least on one strand, said blocking device comprising:

a blocking member having a circular shape, freely rotatable about an axis, and movable in translation;

a hollow body comprising:

at least one cavity defining at least one path for passage of each of one or more strands;

a housing for the blocking member;

the device functioning by cooperation of the blocking member with each path of the at least one path for blocking of each strand through a wedging effect;

an elastic mechanism for elastically biasing the blocking member in a direction of blocking of said at least one strand by acting on a member extending along said rotational axis of the blocking member;

an unblocking member for releasing the blocking member, the unblocking member having a gripping portion located at a distance from the hollow body;

the gripping portion of the unblocking member comprising a grip and a handle, connected to the grip, elongated along a vertical median plane of the article of footwear.

* * * * *